Nov. 26, 1935.  H. PIERCE  2,022,521
CUTTING AND GUMMING MACHINE
Filed Oct. 8, 1932  4 Sheets-Sheet 3
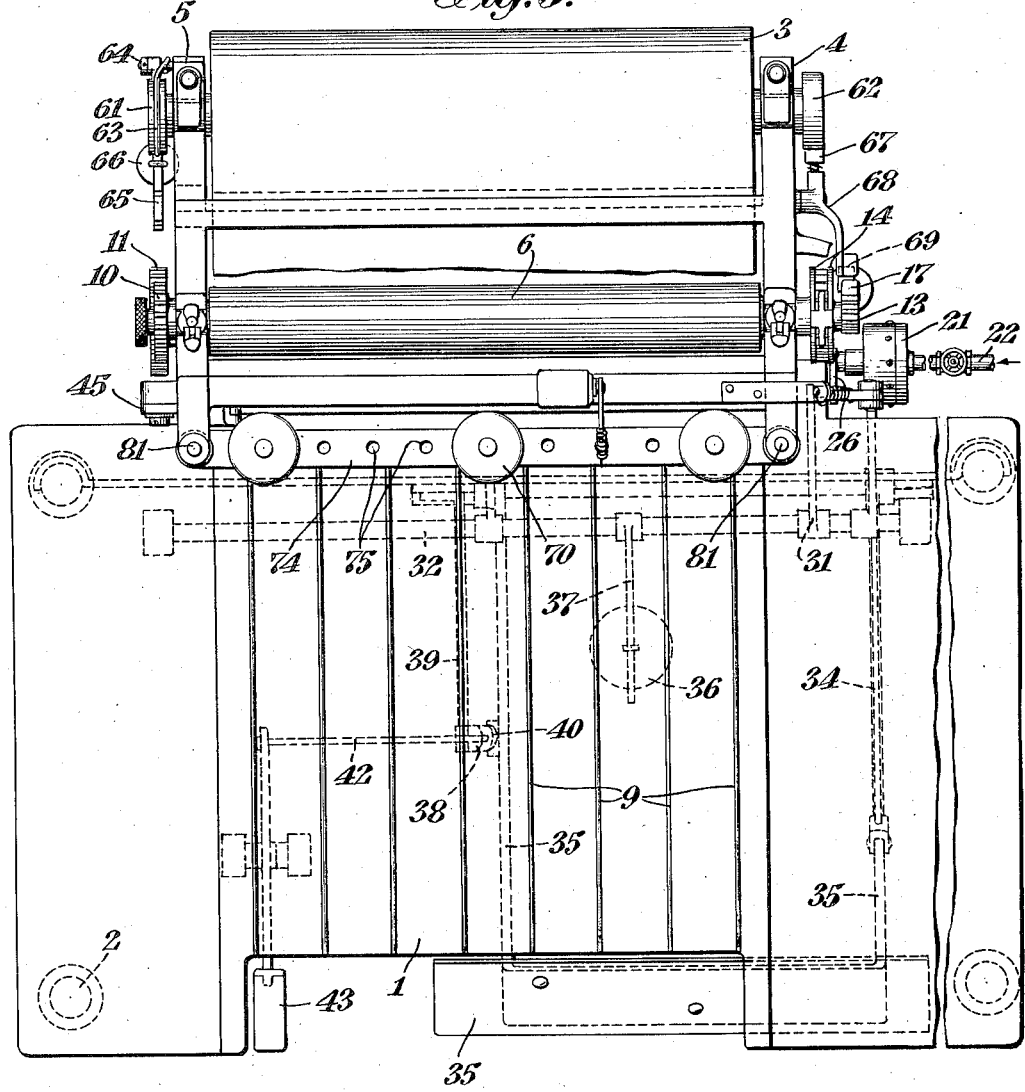
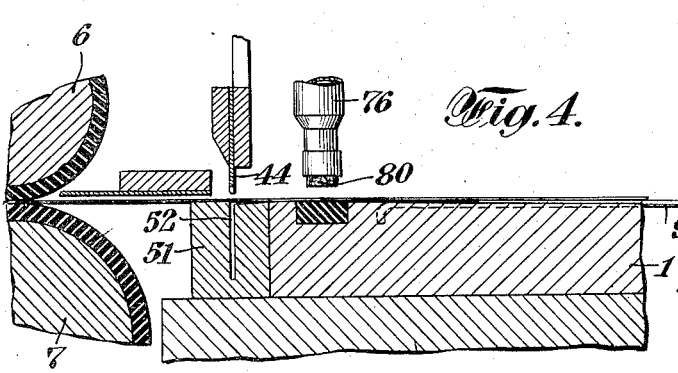
INVENTOR
*Harry Pierce*
BY
*Townsend & Decker*
ATTORNEYS Nov. 26, 1935.   H. PIERCE   2,022,521
CUTTING AND GUMMING MACHINE
Filed Oct. 8, 1932   4 Sheets-Sheet 4
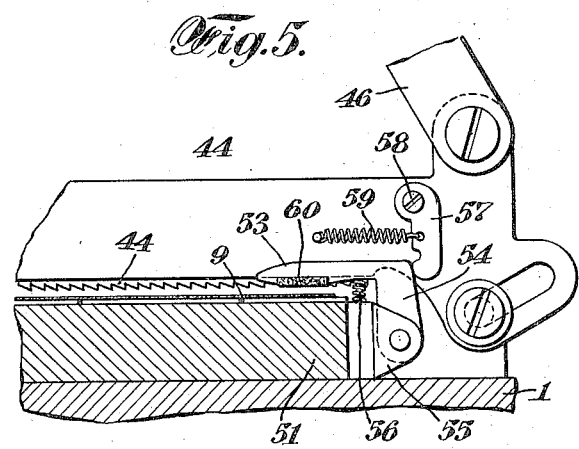
Fig.5.
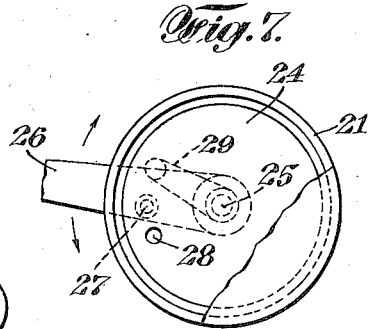
Fig.7.
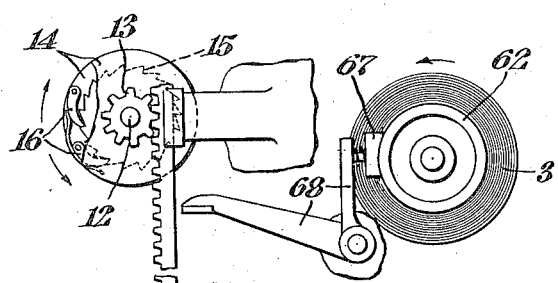
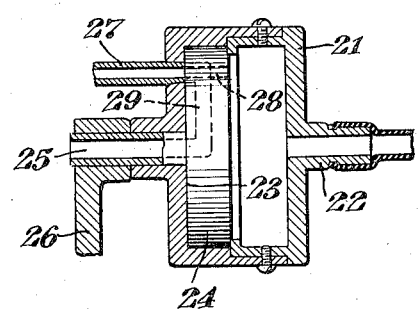
Fig.8.
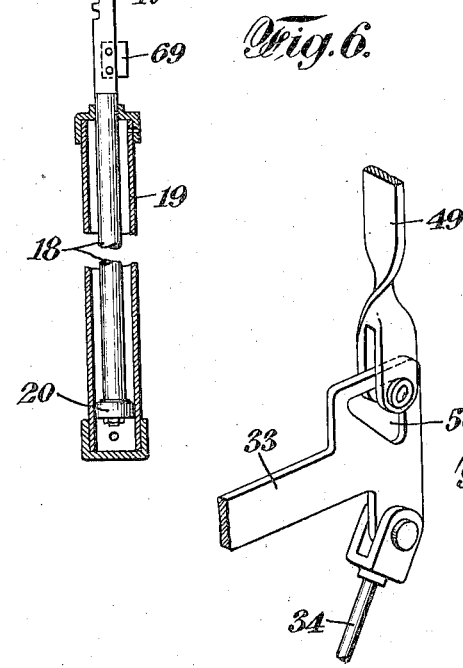
Fig.6.
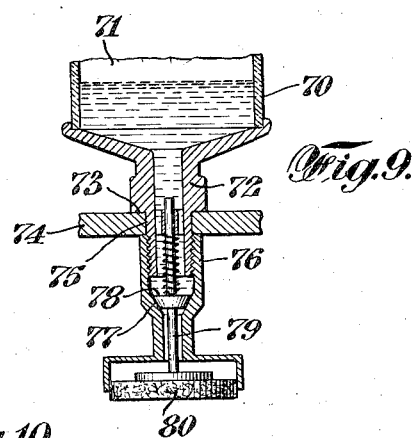
Fig.9.
Fig.10.
INVENTOR
Harry Pierce
BY Townsend & Decker
ATTORNEYS Patented Nov. 26, 1935

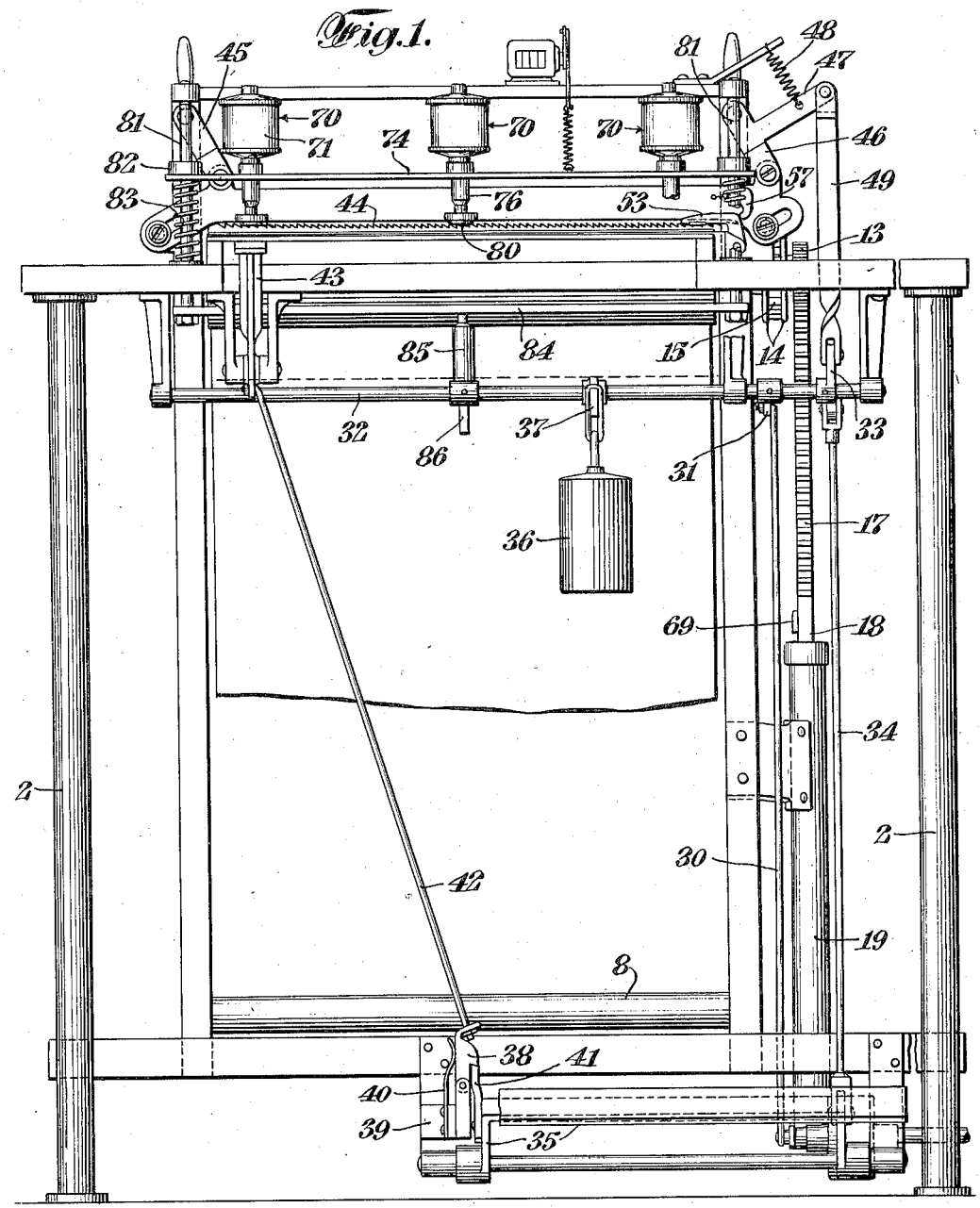

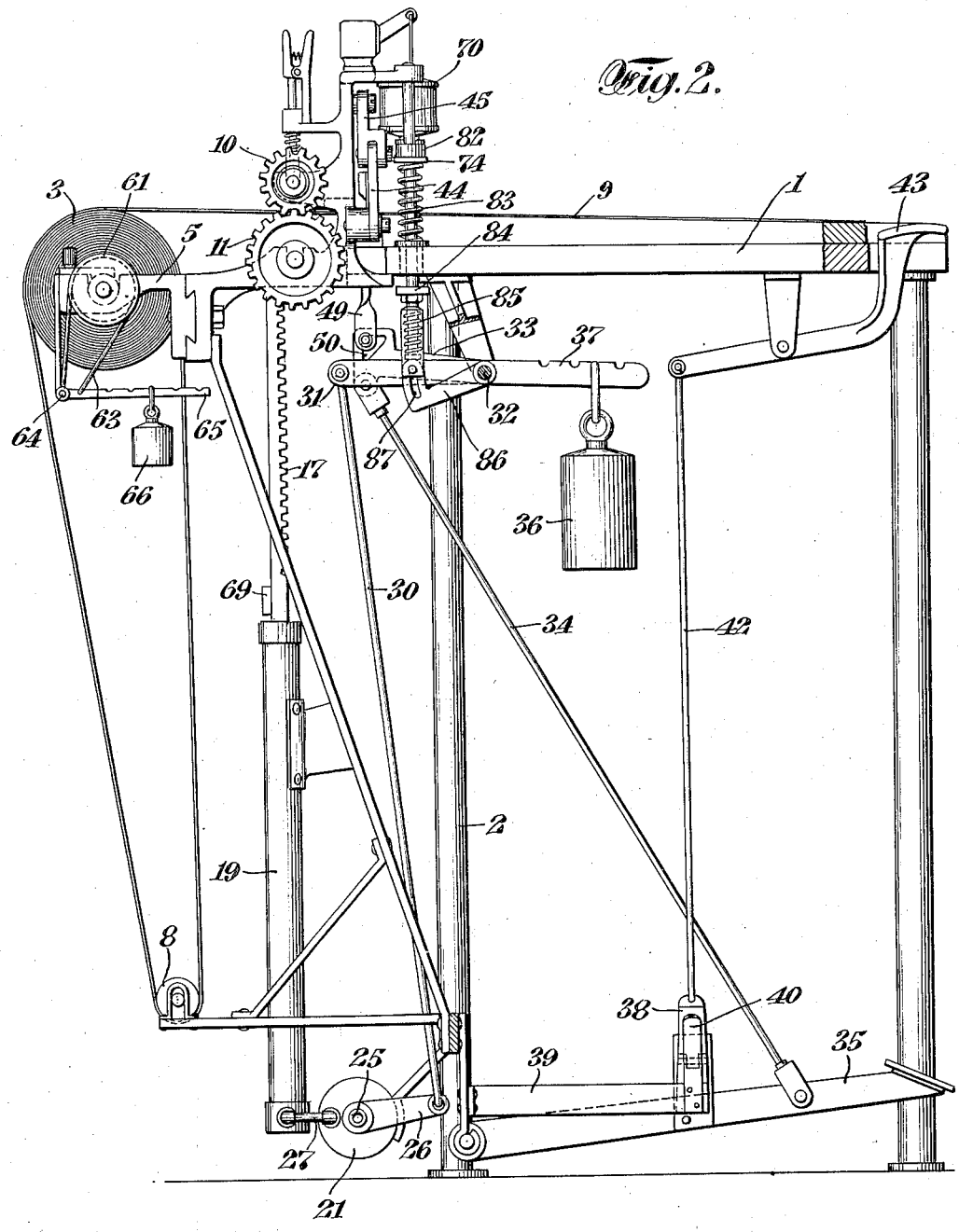

2,022,521

UNITED STATES PATENT OFFICE 2,022,521

CUTTING AND GUMMING MACHINE

Harry Pierce, Brooklyn, N. Y., assignor to The Pilgrim Laundry, Inc., Brooklyn, N. Y., a corporation of New York Application October 8, 1932, Serial No. 636,792

12 Claims. (Cl. 91—14)

This invention relates to cutting and gumming machines, and particularly to such machines capable of handling cellulose material to feed and cut the same from rolls.

Heretofore cellulose material, particularly for wrapping large bundles such as shirts, has been used in individual sheets of proper size, due to peculiarities of the material which has made it practically impossible to feed it from a roll and cut it in lengths by known means. Amongst the difficulties encountered have been the slipperiness of the material, its lack of rigidity sufficient to enable it to be pushed ordinarily without crinkling, and also difficulties encountered both in trying to cut the material and resulting from cutting the same.

The present invention has for its objects to overcome the difficulties referred to above; to enable cellulose material to be readily used from rolls and cut to length; to prevent sidewise creeping of the material; to hold it taut while being cut; to clear the cut edge from the cutter after cutting; to obtain forward movement of the material without crinkling; to secure simplicity of construction and operation, and to obtain other advantages and results as may be brought out in the following description.

Referring to the accompanying drawings in which like numerals of reference indicate similar parts throughout the several views;

Figures 1, 2 and 3 are front and side elevations and plan respectively of a cutting and gumming machine embodying my invention;

Figure 4 is a detail sectional view of portions of the feed rollers and table;

Figure 5 is a face view of a portion of the cutter and the material clamping device;

Figure 6 is an elevational view, partly broken away and in section, of the material advancing and stopping means;

Figure 7 is a face view of the valve for the material advancing means;

Figure 8 is a cross-sectional view thereof;

Figure 9 is a vertical sectional view of the adhesive applying device; and

Figure 10 is a perspective view of a part of the operating linkage therefor.

In the specific embodiment of the invention illustrated in said drawings, the machine consists in general of means for supporting a roll of cellulose material, from which roll the material is carried automatically across a table by means of power driven feeding rollers. Rotation of the feeding rollers is accomplished by a plunger actuated rack engaging a pinion on one roller, the plunger being pneumatically operated and controlled by a valve convenient to the operator. A cutter is provided to sever the material, this cutter being controlled by a treadle, depression of which both depresses the cutter and shifts the valve to return the plunger to initial position.

Referring now in greater detail to the construction of the machine and the features of the invention, the reference numeral 1 indicates a table having legs 2. At the back of the table is a means for supporting a roll 3 of cellulose material, said means being shown as a fixed bearing 4 and an adjustable bearing 5 which may be brought closer to or further from the fixed bearing to accommodate the desired width of rolled material. The material is fed forwardly across the table by passing between juxtaposed feed rollers 6 and 7 parallel to the roll 3 of material and also at the back of the table. In order to overcome any slight conditions of non-parallelism between, these feed rollers and the roll of material, I preferably pass the material from the front of its roll 3 downwardly for a relatively long reach to an idler 8 and then upwardly again to the back of and forwardly over said roll 3 to the feed rollers. To reduce frictional resistance of the table to forward movement of the material, a plurality of rails, here shown as wires 9, extend across the table from back to front therefore of longitudinally of the direction of movement of the material.

According to the present showing, the feed rollers 6 and 7 have inter-meshing gears 10, 11 respectively at one end of the rollers for driving one from the other, and at the opposite ends of the rollers, one of them, as for instance, the lower one of said rollers, has its axle 12 extended. On the end of said axle 12 is rotatably carried a pinion 13 between which and the roller are a pair of spaced parallel discs 14, 14 fast with respect to the pinion and rotatable upon said axle. Between these discs is a ratchet wheel 15 secured to the axle so as to rotate therewith. A spring actuated pawl 16 adjacent the periphery of the discs is carried therebetween in engagement with the ratchets, so that rotation of the pinion and discs in one direction actuates the ratchet wheel, axle and roller, whereas rotation in the other direction obtains no such rotation of the ratchet wheel, axle or roller.

In mesh with and depending from the pinion 13 is a rack 17 having at its lower end a plunger 18. Said plunger extends into a long cylinder 19 and has a piston head 20 at its lower end to engage the cylinder wall. Pressure introduced into the cylinder below the piston will raise the same together with the rack and rotate the pinion and during movement in this direction the pawl 16 engages ratchet wheel 15 for rotating the roller. Release of pressure from the cylinder permits the piston, plunger and rack to return, as by gravity, with the pawl riding freely over the ratchets without any actuation of the roller.

A valve 21 is provided for controlling admission and release of the pressure to the cylinder. This valve may conveniently provide a cylindrical housing at one end of which is an inlet nipple 22 for the pneumatic pressure derived from any suitable source (not shown). At the opposite end of the housing which forms a seat 23 is a valve head 24 rotatable in constant contact with said seat. Centrally of the valve head is provided a hollow stem 25 projecting through the valve seat to the exterior of the housing. A crank 26 is attached to the stem for rotating the valve head. A tubular connection 27 enters through the housing and valve seat eccentrically with respect to the stem, and is adapted to communicate with an inlet passage 28 passing directly through the valve head. When this inlet passage 28 is juxtaposed in alinement with the tubular connection, pneumatic pressure will be transmitted from within the valve housing to said connection, which in turn communicates with the rack-operating cylinder 19. Another, or outlet passage 29 communicates with the tubular stem and outwardly through the face of the valve head next the valve seat at a point which also may be juxtaposed to the tubular connection, thereupon releasing the pressure in the rack-operating cylinder to the atmosphere. The parts are preferably so arranged that lifting crank 26 to its uppermost position will bring the inlet passage 28 through the valve head into juxtaposition to the tubular connection, while lowering the crank to its position furtherest down will bring the outlet passage into juxtaposition with said tubular connection. Between these two positions, the tubular connection is closed by a solid portion of the valve head.

Appropriate link and leverage connections are made to connect with and operate the valve crank 26. As here shown, a link 30 extends upwardly to the outer end of an arm 31 fixed on a rocker shaft 32 beneath the table. On said shaft is fixed a T-arm 33 extending rearwardly and with a depending link 34 shackled to one end of the T-head. This link is shackled at its lower end to a forward part of one reach of a U-shaped treadle 35. This treadle has three positions, namely, normal or middle positions as shown in Figure 2, a lifted position above normal and a depressed position below normal. At normal position of the treadle, the valve head is in its neutral position with neither passage communicating with the tubular connection, while in raised position of treadle the intake opening is in communication with said connection and in lowered position the outlet opening is in communication therewith. A counter-weight 36, placed for instance on a weight arm 37 extending forwardly from the rocker shaft 32, tends to swing the treadle to its uppermost position. However, a releasable latch 38 (see Fig. 1) holds the treadle in its normal position by stopping the upward swing. This latch is shown carried by a bracket 39 to which is also secured a leaf spring 40 pressing the latch toward the treadle. A dog 41 secured to the treadle underlies the latch in holding position thereof and slides past the latch when the latch is withdrawn or swung back. Withdrawal of the latch is effected by pulling upon a rod 42 by means of a hand lever 43 convenient to the operator, as at the front of the table.

Means are provided for operating a knife or cutter as a result of the depression of the treadle from normal to lowermost position. The cutter is here shown as comprising a saw-like blade 44 extending crosswise of the machine, parallel to the feed rollers and as close as practical thereto. This blade or cutter is mounted so as to depress with a slicing motion, one end being mounted by a bar-like hanger 45 whereas the other end is mounted by the cross-head of a T-shaped hanger 46; from the middle of which extends the stem or lever 47 for operating purposes. A spring 48 tends to lift this lever, thereby swinging the hangers into a diagonal position and thus raising the blade. A depending link 49 depends from the outer end of said lever 47 to the upwardly projecting T-head of previously described T-arm 33. This T-head is slotted, as at 50, to allow desired lost motion to permit movement of the treadle above normal position without affecting the cutter, but obtaining actuation of the cutter during movement of the treadle below normal position.

The table is provided with a cooperating die 51 slotted longitudinally beneath the cutter as at 52, so that the cutter will enter the slot in completing the cut. Preferably the top face of the die 51 on the side of this slot 52 next the roll of material is somewhat higher, for instance a sixty fourth of an inch or more, than the top face of the die on the side of the slot toward the operator. This is an important feature, for in cutting sheet material, and particularly cellulose material, burrs or rough edges are struck from the edge as cut, and these burrs tend to engage the edge of the slot when attempting to advance the material again. Cellulose sheet material is exceptionally easy to crinkle and the hindrance offered by the rough edge of the same engaging the edge of a slot is sufficient to throw the material out of its normal plane and prevent proper pushing feed by the feed rollers. In this connection it may be added that the cellulose material tears with difficulty, and therefore does not respond readily to usual shearing cuts. I have accordingly not only provided a slotted die to insure the cutter passing through the material, but have provided a blade with teeth which puncture the material and complete the cut by a diagonal depression or sliding motion.

In view of the diagonal or sliding motion of the cutter, it is an important feature of the present invention to overcome and prevent the tendency for the material to also slip sidewise. For the machine to have any efficient utility this slip preventative or holding means must operate automatically with each depression of the cutter. As one specific automatic holding means, there is shown in Figure 5 a gripping finger 53 overlying the margin of the material adjacent one end of the cutter. This finger has a depending end 54 pivoted to a fixed part such as to a lug 55 on the end of die 51. A spring 56 beneath the finger tends to keep it elevated until positively depressed. Depending opposite the depending end of the finger is a yielding pusher 57 comprising an elongated member pivoted as at 58, at its upper end to the knife and depending so that its lower end will engage the end edge of the finger 53. A tension spring 59 keeps the pusher drawn toward the finger. As the cutter moves diagonally, the engagement of the pusher with the finger results in a pushing action upon the finger to depress the same and hold it firmly against the material. A gripping surface 60 may be applied to the underside of the finger at the part thereof which engages the material.

The holding of material effected by the gripping finger is supplemented by a brake for holding the roll. As here shown, the core of the material roll has a brake drum 61 on one end and brake drum 62 on the other. Around one of these drums, as 61, extends a flexible brake band 63 one end of which is held firmly and the other end of which is attached near the fulcrum 64 of a lever 65 on the outer end of which is an adjustable weight 66. This brake prevents free movement of the material roll and necessitates a positive and considerable pull upon the material to unroll the same.

The other brake drum 62 on the material roll is, as shown in Figure 6, adapted to be engaged by a brake shoe 67 carried on one arm of a bellcrank lever 68, the other arm of which is in the path of a dog 69 on the roller actuating rack 17. This dog is properly adjusted to engage the bell crank lever and apply the brake just as the desired quantity of material has been unrolled. There will therefore be no slack in the length of material between the roll of material and the feed rollers.

Simultaneous with cutting of the material it is also desirable to apply adhesive thereto. For that purpose there is provided a plurality of adhesive devices indicated generally by numerals 70. One of these devices is shown in detail in Figure 9 as providing a reservoir or pot 71 with a depending hollow neck 72 with a shoulder 73 for seating upon a bar 74. Said neck passes partly through one of a plurality of holes 75 provided in said bar and is screw threaded therebelow to receive a casing 76 providing an internal upwardly directed valve seat 77. A valve 78 normally nests upon said seat under influence of a spring if desired. The valve 78 has a stem 79 depending therefrom and carrying a dauber 80 at its lower end. When the dauber engages the material on the table, dauber, stem and valve are lifted and a quantity of the adhesive is permitted to flow from the pot to the dauber.

Raising and lowering of the several adhesive applying devices is obtained by operation of the foot treadle 35. As best seen in Figure 1, the perforated bar 74 carrying the adhesive applying devices receives upright rods 81 at its ends and underlies collars 82 fast on said rods. These rods extend downwardly through the table and between the table and bar are spiral springs 83 which hold the bar normally raised. Below the table, the rods are connected by another rod or yoke 84 parallel to the perforated bar 74. At a middle part of this yoke 84 is a shock absorbing connection 85 connected to a slotted lever 86 extending rearwardly thereto from the rocker shaft 32. The slot 87 in this lever extends downwardly from the pin engagement with the connection 85 so as to permit a lost motion between those parts while rocker shaft 32 is rotated under influence of the movement of the treadle 35 between its normal and upper positions, but effecting operation of the yoke when the treadle is moved between its normal and lower positions.

It will be observed that, by virtue of the plurality of perforations in the adhesive device supporting bar 74 that the adhesive may be applied at spots where desired, and that the devices may be appropriately arranged in event a roll of material is used of less width than the length of the feed rollers. The only other adjustment required for narrower material is the resetting of the adjustable bearing 5 for the roll of material as heretofore described.

Having thus described the invention I claim:

1. A machine as characterized, comprising a table, means at the rear of said table for advancing material thereover, a cutter at the rear of said table, said table having a slot provided therein beneath the cutter to receive the same when cutting, the forward surface adjacent said slot being lower than the surface at the rear of the slot whereby the forward edge of the slot is out of the path of the material when advancing the material across the slot after cutting.

2. A machine as characterized, comprising a table, means for advancing material across said table, means for cutting the material, adhesive applying devices, means for lowering said devices to the table, and a foot treadle for causing actuation of the material advancing means when said foot treadle is in a predetermined position and effecting cutting and application of adhesive to the material when said treadle is in a different predetermined position, the cutting means and adhesive applying devices having a lost-motion connection with said treadle.

3. A machine as characterized, comprising in combination with a table of automatic means for advancing material across said table including a plurality of rollers through which the material passes, means positioned forwardly of said rollers for cutting the material, adhesive applying means mounted to move vertically into engagement with the material on the table, a valve within said adhesive applying means controlling the discharge of adhesive and actuated by engagement and disengagement of said adhesive applying means with the material and manually operable means for actuating both said cutting means and said adhesive applying means.

4. A machine as characterized, comprising in combination with a table for supporting material of adhesive applying means comprising a bar and a plurality of daubers carried by said bar and overlying the table where the material is supported, reservoirs for adhesive, valves controlling admission of adhesive from the reservoirs to the daubers, and manually operable means for moving said bar vertically to bring said daubers into contact with said material whereby said valves will be automatically operated with each depressive engagement of the daubers with the material.

5. A machine as characterized, comprising in combination with a table, of automatic means for advancing material across said table, means for cutting the material, vertically movable adhesive applying means having a dauber overlying the table where the material is supported, a reservoir for adhesive, and a valve controlling admission of adhesive from the reservoir to the dauber, said valve being automatically operated with each depressive engagement of the dauber with the material and said valve closing tightly after release of the dauber from the material and remaining open during contact of the dauber with the material and manually operable means for first actuating said cutting means and then said adhesive applying means.

6. A machine as characterized, comprising a table, a cylinder, a reciprocable piston therein, a rack carried by said piston, a source of fluid pressure communicating with said cylinder, a roller adapted to advance material across said table, a gear carried by said roller and meshing with said rack, a cutter and means for admitting the fluid supply from its source to said cylinder to actuate said rack and thereby rotate said roller and also to actuate said cutter to cut said material.

7. A machine as characterized, comprising a table, means for advancing material across said table, means for cutting the material, means for applying adhesive to said material, an actuator for controlling actuation of said advancing means and a second actuator for controlling actuation of said cutting means and adhesive applying means and for resetting said first-named actuator.

8. A machine as characterized, comprising a table, means for cutting the material, means for applying adhesive to said material, a hand lever for controlling actuation of said advancing means and a foot lever for controlling actuation of said cutting means and adhesive applying means and for resetting said first-named actuator with a lost-motion connection between said foot lever and said cutting means.

9. A machine as characterized, comprising a table, automatic means for advancing sheet material across said table, means for actuating said advancing means, a cutter adjacent said advancing means, said cutter having a diagonal path of movement in a cutting direction with the cutting edge substantially parallel to the plane of the table, means for actuating said cutter and a pivoted holding finger mounted independently of said cutter adjacent the path of movement of one edge of the material for gripping the same thereat with the remaining portion of the material next the cutter free, said finger cooperating with the pull on the material by the diagonal movement of the cutter to keep said free portion of the material next the cutter taut throughout the length engaged by the cutter while said portion is being cut.

10. A machine as characterized, comprising a table, means for advancing sheet material across said table, means for actuating said advancing means, a cutter adjacent said advancing means, said cutter having a diagonal path of movement in a cutting direction with the cutting edge substantially parallel to the plane of the table, means for actuating said cutter, a pusher pivoted to said cutter, and a holding finger mounted independently of said cutter and operated by said pusher upon the depression of the cutter in advance of cutting engagement of the cutter with the material, said finger overlying one edge of the material for gripping the same thereat with the remaining portion of the material next the cutter free, said means cooperating with the pull on the material by the diagonal movement of the cutter to keep said free portion of the material next the cutter taut throughout the length engaged by the cutter while said portion is being cut.

11. A machine as characterized, comprising a table, means for advancing sheet material across said table, means for actuating said advancing means, a cutter adjacent said advancing means, said cutter having a diagonal path of movement in a cutting direction with the cutting edge substantially parallel to the plane of the table, means for actuating said cutter, a spring-pressed holding finger adjacent one end of the cutter, and a yielding means on the cutter for swinging said finger into depressed and material holding position in advance of the cutting engagement of the cutter with the material, said finger overlying one edge of the material for gripping the same thereat with the remaining portion of the material next the cutter free, said means cooperating with the pull on the material by the diagonal movement of the cutter to keep said free portion of the material next the cutter taut throughout the length engaged by the cutter while said portion is being cut.

12. A machine as characterized, comprising a table, means at the rear of said table for mounting a roll of material, feed rollers intermediate said mounting means and the table for advancing the material across the table, means for operating said feed rollers, a brake associated with the roll of material for retarding unwinding of the material from the roll and holding the material taut during the unwinding and a second brake actuated by said operating means for stopping rotation of said roll simultaneously with the stopping of said operating means.

HARRY PIERCE.